United States Patent [19]
McIntosh

[11] 3,873,977
[45] Mar. 25, 1975

[54] DATA COMPRESSION METHOD AND APPARATUS

[75] Inventor: Duane E. McIntosh, Santa Ynez, Calif.

[73] Assignee: General Motors Corporation, Detroit, Mich.

[22] Filed: May 1, 1974

[21] Appl. No.: 465,854

[52] U.S. Cl. ............... 340/347 DD, 178/68, 360/40
[51] Int. Cl. ............................................ H03k 13/24
[58] Field of Search ................ 340/347 DD; 360/40; 178/68

[56] References Cited
UNITED STATES PATENTS
3,691,553 9/1972 McIntosh .................... 340/347 DD

*Primary Examiner*—Malcolm A. Morrison
*Assistant Examiner*—R. Stephen Dildine, Jr.
*Attorney, Agent, or Firm*—Albert F. Duke

[57] ABSTRACT

Data compression methods and apparatus are disclosed wherein the first of several identical words is coded in accordance with prescribed coding rules and the remaining redundant data words are coded by one or more injections of a unique transitional pattern consisting of a three bit symmetrical square wave in the coded data waveforms to identify the number of redundant words.

7 Claims, 11 Drawing Figures

PATENTED MAR 25 1975

3,873,977

SHEET 8 OF 9

DATA COMPRESSION METHOD AND APPARATUS

This invention relates to an information communications system and more particularly to a method of reducing the amount of data transmitted in an information communications system and the apparatus therefor.

In the information communication art the bandwidth requirements of a communications channel are frequently not compatible with the bandwidth of the signals representing the information to be transmitted. This occurs when a communication channel such as a conventional telephone line is utilized for the transmission of digital signals. The digital signals may represent telemetry information, information obtained from a digital computer, video information, facsimile information, digital voice, or the like.

The prior art has developed various systems for increasing the amount of information that may be transmitted over a fixed capacity communication channel. It is recognized by those with ordinary skill in the art that in various communication systems large portions of the transmitted information is redundant. If such redundancy is removed prior to transmission the efficiency of the system may be improved. One prior art system includes predictive techniques wherein a code representing a mathematical function which describes an information signal is transmitted instead of the information signal itself. However, this only approximates the information signal and accurate recovery thereof from the coded representation is prejudiced. Other prior art systems incorporate run length coding, delta modulation and the like. In run length coding, binary numbers corresponding to various blocks of data are sent rather than the usual data signals. In such a system, a binary number of relatively few bits may be sent in lieu of a larger block of data. One of the problems encountered in run length coding is that if the change density of the data is high a negative compression ratio can result.

A common feature of these prior art systems is the removal of redundant information and the transmission of non-redundant information. Consequently, if the amount of data representing the information to be transmitted may be reduced by, say one-third, the fixed capacity communications channel may be successively utilized to transmit three times as much information. Stated otherwise, as the amount of data is compressed the bandwidth required to transmit the information is correspondingly compressed.

It is an object of the present invention to provide an improved method of data compression and the apparatus therefor.

It is another object of the present invention to provide a method of an apparatus for reducing the amount of data required to transmit information in such manner that the transmitted data is sufficient to enable accurate recovery of the information.

It is a further object of this invention to provide a method and apparatus for encoding a plurality of multibit digital words which are identical within a predefined tolerance by encoding one of the words in accordance with prescribed coding rules while injecting a unique character in the encoded waveform which identifies the number of additional words which are identical to the word which is encoded.

It is another object of this invention to provide a method of and apparatus for regenerating information including redundant and non-redundant portions from compressed data.

Various other objects and advantages of the invention will become clear from the following detailed description of the embodiment thereof and the novel features will be particularly pointed out in connection with the appended claims.

In accordance with this invention, a method of and apparatus for data compression is provided wherein the information to be encoded is obtained from a data source in the form of a multibit word and an accompanying binary code word indicating the number of additional words which are identical within a predefined tolerance with the data word. The data word is encoded in accordance with the coding method described in my copending U.S. application Ser. No. 404,231, assigned to the assignee of the present invention. That encoding method causes transitions in a bilevel output signal at the beginning or middle of selected bit cells to identify the data. After the first transition in a data word occurs, the encoding of the data word is terminated provided that redundant words exist, and a redundant word character is inserted one or more times to identify the number of redundant words. Thereafter, the coding of the data word is completed. In reconstructing the original data the occurrence of the redundant word character is identified to determine the number of redundant words and those transitions associated with the data word are utilized to reproduce the original data as disclosed in the aforementioned copending U.S. application Ser. No. 404,231.

The invention will be more clearly understood from the following detailed description which should be read in conjunction with the drawings in which.

Figure 1:
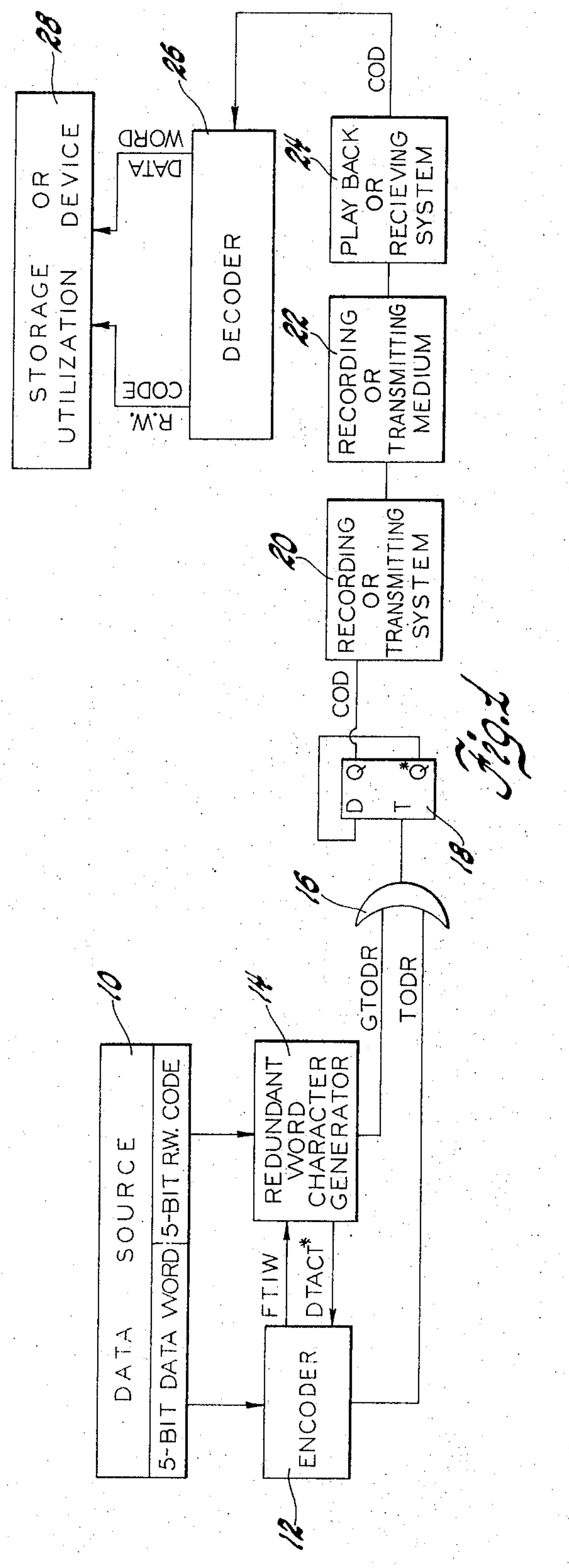
FIG. 1 is a block diagram representing the apparatus of the present invention.

Referring now to the drawings and initially to FIG. 1, the apparatus of the present invention includes a data source generally designated 10 which provides at its output a data word shown by way of example as a five bit data word and an accompanying five bit redundant word code. The five bit data word is provided to an encoder 12 such as disclosed in the aforementioned copending application Ser. No. 404,231, which provides an output designated TODR. The five bit binary code which identifies the number of additional words of data which are identical within a predefined tolerance with the five bit data word is provided to a redundant word character generator generally designated 14. The generator 14 provides an output designated GTODR which is OR'ed with TODR in a gate 16, the output of which is connected with the toggle input of a toggle flip-flop 18. The output of the encoder 12 toggles the flip-flop 18 at the beginning or middle of selected bit cells to identify the data bits in the five bit data word. The output of the generator 14 toggles the flip-flop to produce a redundant word character or transitional pattern containing a pair of transitions, the first of which occurs at the beginning of a bit cell and the second of which occurs at the middle of the following bit cell. The generator 14 is responsive to an output of the encoder 12 designated FTIW (First Transition in Word) and is effective upon receipt of the signal to produce an output designated DTACI* which disables the encoder so that the transitional pattern may be inserted following a data transition. The transitional pattern may be inserted one or more times depending on the number of redundant words to be encoded.

Figure 2:
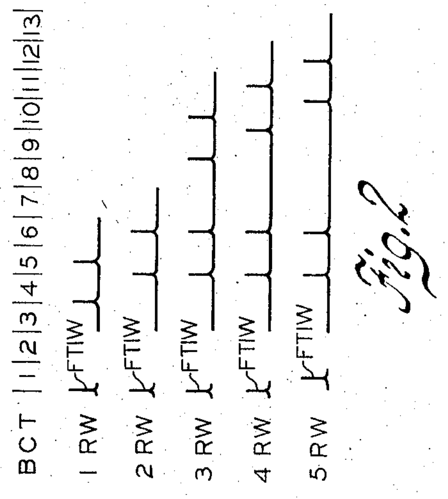
FIGS. 2 and 3 are waveform diagrams useful in explaining the invention.

Referring now to FIG. 2, the GTODR output of the generator 14 which occurs when coding one, two, three, four, or five redundant words is shown. In these waveforms the FTIW pulse produced by the encoder 12 is shown, by way of example, as occurring at the beginning of the bit cell interval 1 during the encoding of one, two, three, or four redundant words and at the middle of bit cell interval 1, for the encoding of five redundant words. It will be understood, of course, that the FTIW pulse may occur at either the beginning or the middle of a bit cell interval regardless of the number of redundant words to be encoded.

As will be pointed out more particularly hereinafter, the encoder 12 produces a TODR pulse causing a transition in the COD waveform at the beginning of a bit cell to identify each uncoded bit of one particular binary characterization, for example, a binary 1. Whether the pulse occurs at the beginning or middle of the bit cell is dependent upon whether the following bit cell contains a binary 1 or a binary 0, respectively. Thus, each transition in the COD waveform identifies two bits of previously uncoded binary data. In so doing, transitions in the COD waveform are separated by a minimum of 1½ bit cells and where a pair of transitions are separated by this minimum of 1½ bit cells the first transition of a pair always occurs at the middle of a bit cell and the second transition of the pair occurs at the beginning of a bit cell, i.e. the pair of transitions do not occur in adjacent bit cells. Since transitions are produced in a COD waveform only when representing the dibits 11 and 10 it will be appreciated that a long string of 0's will cause no transition to be produced in the waveform. Since the constant DC level produced by coding a string of 0's can produce problems in decoding the information, this DC level is broken up by injecting a unique waveform where at least three consecutive 0's occur in the data. This unique waveform consist of a transition at the beginning of a bit cell containing the first of the three consecutive 0's and at the middle of the bit cell containing the second of the three consecutive 0's. Since the first transition in the unique transitional pattern would normally be interpreted during decoding as a 1 followed by a 1, it is apparent that the second transition, which occurs during the middle of a second bit of the dibit 11, does not represent the dibit 10 since this would result in coding the second bit twice. Accordingly, where a transition occurs at the beginning of a bit cell and is followed by a transition 1½ bit cells later this is detected by the decoder as representing the three bit configuration 000.

As shown in FIG. 2 the generator 14 produces output pulses which produce the unique transitional pattern in the COD waveform. The unique pattern associated with redundant words is distinguishable from the unique pattern identifying the three bit configuration 000 by the fact that the pattern is delayed from the point where it would normally occur were the three bit configuration 000 being encoded. As shown in FIG. 2, the FTIW pulse identifies the bits in bit cell time 1 and 2. To code one redundant word the generator 14 produces pulses at the beginning of bit cell time 4 and the middle of bit cell time 5. Thus, the delay in the injection of the unique transitional pattern for one bit cell from the first point where injection could have occurred represents the coding of one redundant word of data. To code two or more redundant words the unique transitional waveform is delayed by 2 bit cells so that the first injection occurs at the beginning of bit cell 5 which effectively encodes two redundant words. If three redundant words are to be encoded a second injection occurs which is delayed by an additional bit cell (i.e., bit cell 8). For four redundant words the second injection is delayed by 2 bit cells, and for five redundant words the second injection is delayed by 3 bit cells. For additional redundant words additional injections may be inserted with the maximum delay being 3 bit cells for any particular injections. A maximum of 3 bit cell delay is provided to insure that transitions occur at least every 4½ bit cells which is the maximum interval encountered when encoding data in accordance with the encoder 12.

Figure 3:
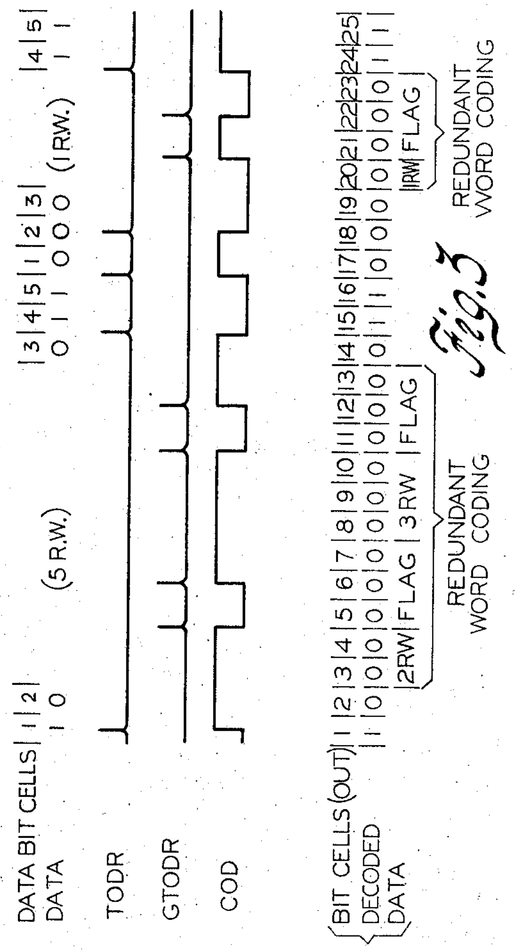

FIG. 3 shows a coded waveform produced when encoding six 5 bit data words of the configuration 10011 followed by two 5 bit data words consisting of the configuration 00011. When the data word 10011 is presented to the encoder 12, a TODR pulse is produced at the middle of bit cell 1 to identify the first two bits as a 1 followed by a 0 thereby producing a transition in the COD waveform at the middle of bit cell 1. The coding of the five redundant words is accomplished by injecting the redundant word character after a delay of 2 bit cells, i.e., bit cells 3 and 4. The redundant word character occupies the bit cells 5, 6, and 7. The redundant word character is then reinserted after a three bit cell delay, i.e. bit cells 8, 9, and 10 to complete the coding of the five redundant words. The second insertion of the redundant word character occupies the bit cells 11, 12, and 13. At the beginning of bit cell 14, coding of the five bit data word is continued. At the beginning of bit cell 15 a transition is provided to code the dibit 11. The first three bits of the second five bit data word are all 0's and are represented by a transition at the beginning of bit cell 17 and the middle of bit cell 18. Since neither one of these transitions alone represent true data, rather the combination of the two transitions represents three bit configuration 000, the second transition, i.e. the transition at the middle of bit cell 18 is considered the first transition in the word. Accordingly, the redundant word character is inserted after a 1 bit cell delay, i.e. bit cell 20, and occupies the bit cells 21, 22, and 23. Since there is only one redundant word associated with the five bit data word 00011, coding of the data word is continued at the beginning of bit cell 24 with a transition representing the dibit 11.

Returning to FIG. 1, the coded data waveform COD may be applied to a recording or transmitting system generally designated 20 for communication on or through a recording or transmitting medium generally designated 22. After application of the coded waveform to a playback or receiving system generally designated 24, the original coded waveform COD is obtained and applied to a decoder generally designated 26. The decoder 26 identifies the data words encoded and also identifies the number of bit cell delays associated with the redundant word character and applies the data word and the redundant word code, to a storage or utilization device generally designated 28.

Returning to FIG. 3, the decoder 26 identifies each transition in the COD waveform as representing a binary 1 and also identifies the data in the following bit cell as a binary 1 if the transition occurs at the beginning of a bit cell and as a binary 0 if the transition occurs at the middle of a bit cell. The decoder 26 identifies a transition which occurs at the beginning of a bit cell followed by a transition at the middle of the next bit cell as a unique transitional pattern and identifies the pattern as representing the three bit data configuration 000. If the unique transitional pattern does not occur at the first possible point of injection of the transitional pattern it is identified as represented redundant words and the number of bit cell delays associated with the pattern are accumulated to identify the number of redundant words.

Accordingly, the transition which occurs at the middle of bit cell 1 is interpreted as representing the dibits 10 occupying bit cells 1 and 2. Since no transition occurs in bit cells 3 and 4 these bit cells are initially identified as binary 0's. The unique transitional pattern occupying bit cells 5, 6, and 7, and 11, 12, and 13 are initially identified as the three bit configuration 000. Since no transitions occur in bits 8, 9, and 10, these bit cells are initially identified as containing binary 0's. The decoder 26 recognizes that if the unique transitional pattern occupying bit cells 5, 6, and 7 indeed represented the three bit data configuration 000 the first and second transitions of the transitional pattern should have occurred at the beginning of bit cell 3 and the middle of bit cell 4 respectively, since the cells 3, 4, and 5 would contain three consecutive 0's. Accordingly, the 2 bit cell delay preceding the transitional pattern is interpreted as two redundant words. Similarly, the 3 bit cell delay preceding the transitional pattern in bit cells 11, 12, and 13 is interpreted as three redundant words. The bit cell delays associated with the transitional patterns are accumulated to identify that there are five additional five bit words identical to the word being decoded. It will also be recognized that the data in bit cells 3–13 do not represent real data but rather are associated with the redundant word coding and will be eliminated in reconstructing the five bit data word. No transition occurs during bit cell 14 which bit cell is identified as containing a binary 0. The transition at the beginning of bit cell 15 identifies the bit in bit cell 15 as a 1 and the bit in bit cell 16 as a 1. The transitional pattern occupying bit cells 17, 18, and 19 is identified as the three bit configuration 000 (transitional pattern occurs at the first possible point of injection). The transitional pattern occupying bit cells 21, 22, and 23 is delayed by one bit cell from the first point of possible injection and, therefore, it is associated with redundant word coding. Accordingly, the data in bit cells 20–23 will be eliminated in reconstructing the second five bit data word. The transition at the beginning of bit cell 24 identifies the bits in bit cell 24 as a 1 and the bits in bit cell 25 as a 1. Accordingly, the decoder 26 interprets the coded waveform as representing six five bit words of the configuration 10011 and two five bit data words of the configuration 00011. This represents a total of eight five bit words or 40 bits which are communicated in a coded waveform comprising 25 bits which represents a substantial compression of the data. Additional data compression occurs as the number of redundant words increases since for each additional three redundant words or 15 bits only 6 bits of coded waveform is required. Also, if the data words consist of a larger number of bits than the five represented in the example, additional compression may result depending upon the amount of redundancy in the data being transmitted.

Figure 4:
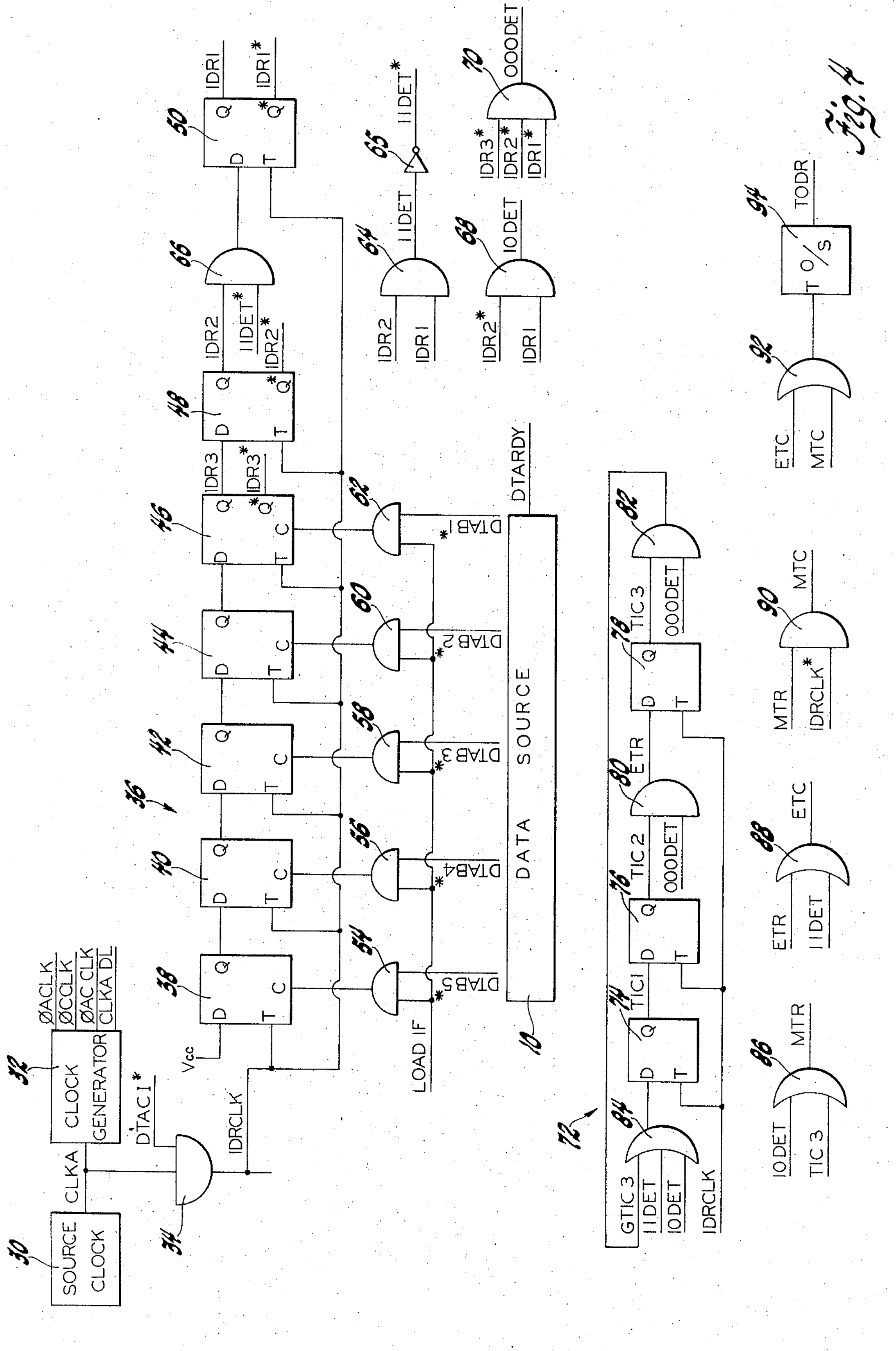
FIGS. 4–7 are detailed logic diagrams of the encoder of the present invention.
Figure 10:
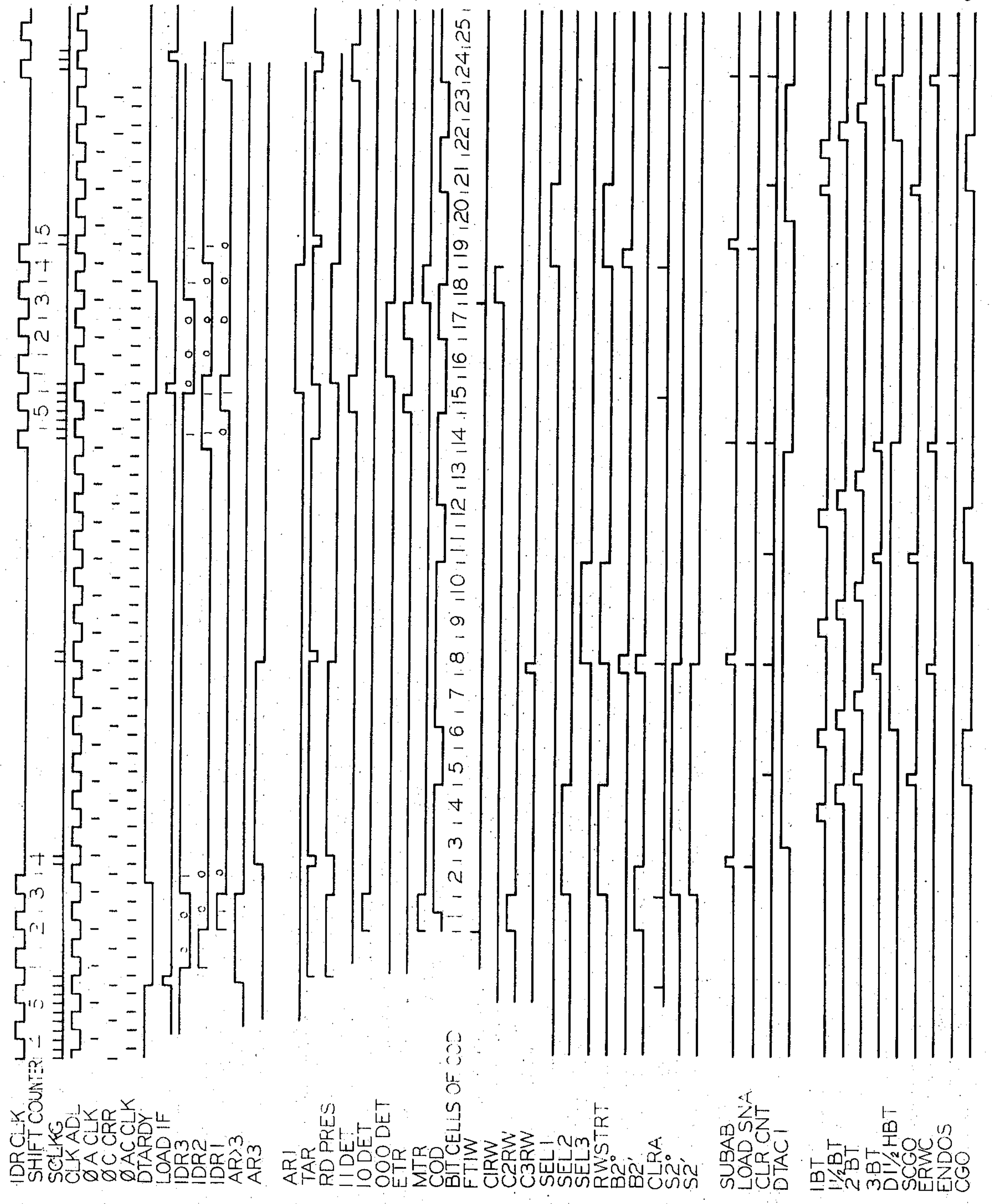
FIGS. 10 and 11 are waveforms showing the encoding and decoding respectively of particular data.

Referring now to FIG. 4, the encoder of the present invention includes a source clock generally designated 30 which produces a square wave output signal at bit rate frequency designated CLKA which is fed to clock generator means generally designated 32 which produces a 0A CLK output corresponding to the leading edge of CLKA, a 0C CLK output corresponding to the falling edges of CLKA, a 0AC CLK signal corresponding to the rising and falling edges of CLKA, and a CLKA DL signal which is identical with CLKA but delayed by a quarter of a bit cell interval. The waveforms for the various clock signals are shown in FIG. 10. CLKA is applied as one input to an AND gate 34 the other input of which is designated DTACI* which is high in the absence of redundant word coding thereby enabling the gate 34 to produce the clock signal designated IDR CLK. The IDR CLK signal serially shifts data through an input data register generally designated 36 which comprises flip-flops 38–50. The D input of the flip-flop 38 is tied to $V_{cc}$. Five bit data words are loaded from the data source 10 into the flip-flops 38–46 of the register 36 through AND gates 54–62, the outputs of which are respectively applied to the CLEAR inputs of the flip-flops 38–46. The source 10 includes a holding register (not shown) which provides the complement of the individual data bits designated DTABT1* – DTABT5* which are applied as one input to the gates 54–62. The other input to the gates 54–62 is designated LOAD IF. Accordingly, the true data appears at the Q outputs of the flip-flops 38–46 and is shifted serially by IDR CLK as long as the gate 34 is enabled. The Q outputs of the flip-flops 48 and 50 designated IDR2 and IDR1 respectively, are applied as inputs to an AND gate 64 the output of which is designated 11 DET. The signal 11 DET is inverted by an inverter 65 to provide a signal designated 11 DET* which is applied to an AND gate 66 to disable the AND gate 66 upon detection of a pair of 1's thereby causing a 0 to be shifted into the flip-flop 50 on the rising edge of the succeeding IDR CLK pulse. The Q* output of the flip-flop 48 designated IDR2*, and IDR1 are applied to an AND gate 68 the output of which is designated 10 DET which is driven high whenever a 1 is shifted into the flip-flop 50 and a 0 is shifted into the flip-flop 48. The Q* outputs of the flip-flops 46, 48, and 50 are applied as inputs to an AND gate 70 the output of which is designated as 000 DET and is driven high whenever three consecutive 0's are stored in the flip-flops 46, 48, and 50.

A transition interval counter generally designated 72 is provided for inserting a unique waveform consisting of a transition at the beginning of a bit cell followed by a transition at the middle of the following bit cell whenever three or more 0's follow the dibits 11 or 10. The counter 72 comprises flip-flops 74, 76, and 78 which are toggled from IDR CLK. The Q outputs of the flip-flops 74, 76, and 78 are designated TIC1, TIC2, and TIC3 respectively. TIC2 and 000 DET provide inputs to an AND gate 80 the output of which is designated ETR (Edge Transition Request) which is applied to the D input of the flip-flop 78. TIC3 and 000 DET are applied as inputs to an AND gate 82 the output of which is designated GTIC3 and is applied as one input to an OR gate 84 the output of which is applied to the D input of the flip-flop 74. The other inputs to the OR gates 84 are 11 DET and 10 DET. 10 DET and TIC3 provide inputs to an OR gate 86 the output of which is designated MTR (Mid-transition Request). ETR and 11 DET provide inputs to OR gate 88 the output of which is designated ETC (Edge Transition Control). MTR and IDR CLK* provide inputs to an AND gate 90 the output of which is designated MTC (Mid-Transition Control). ETC and MTC provide inputs to an OR gate 92 which triggers a one-shot 94 the output of which is designated TODR and is applied through the OR gate 16 to the toggle input of flip-flop 18. The coded output waveform COD appearing at the Q output of the flip-flop 18 thus switches states at the edge or middle of a bit cell in response to the TODR pulses.

The apparatus thus far described is essentially the same as that disclosed in the aforementioned copending application, Ser. No. 404,231, filed Oct. 9, 1973. Briefly, the operation of the apparatus thus far described is as follows: As the data to be encoded is shifted through the register 36; if a 1 is shifted into the flip-flop 50 and is followed by a 1 stored in the flip-flop 48, the flip-flop 18 is toggled to produce a change in state of the output waveform as the dibit 11 is shifted into the flip-flops 48 and 50 on the rising edge of IDR CLK. The toggling of the flip-flop 18 in response to the dibit 11 is accomplished through the gates 64, 88, 92, one-shot 94, and gate 16. On the other hand, if a 1 is shifted into the flip-flop 50 and is followed by a 0 in the flip-flop 48, the flip-flop 18 is toggled on the falling edge of IDR CLK to produce a change in state of the output waveform in the middle of a bit cell. The toggling of the flip-flop 18 in response to the dibit 10 is accomplished through the gates 68, 86, 90, 92, one-shot 94, and gate 16. When either the dibits 11 or 10 are detected a logic 1 is applied to the D input of the flip-flop 74 of the counter 72. As the first bit of the dibit is shifted out of the flip-flop 50 and the second bit is shifted into the flip-flop 50 the Q output of the flip-flop 74 is driven high. As the second bit of the dibit is shifted out of the flip-flop 50 the Q output of the flip-flop 76 is driven high to enable the gate 80. If either of the dibits 11 or 10 is followed by the three bit configuration 000 then at the time TIC2 goes high the Q* outputs of the flip-flops 46, 48, and 50 will go high driving the output of the gate 70 high and causing ETR to go high and toggle the flip-flops 18 through the gates 88, 92, one-shot 94, and gate 16. 1½ bit cells later, the flip-flop 18 will again be toggled through the gates 86, 90, 92, one-shot 94, and the gate 16. The unique waveform consisting of an edge transition followed by a mid-transition continues as long as there are three 0's stored in the flip-flops 46, 48, and 50.

Each word of data from the source 10 is assumed by way of example to include a five bit binary code word which identifies the number of additional words of data which are identical with the data word shifted into the register 36. This code word is applied to the generator 14.

Figure 5:
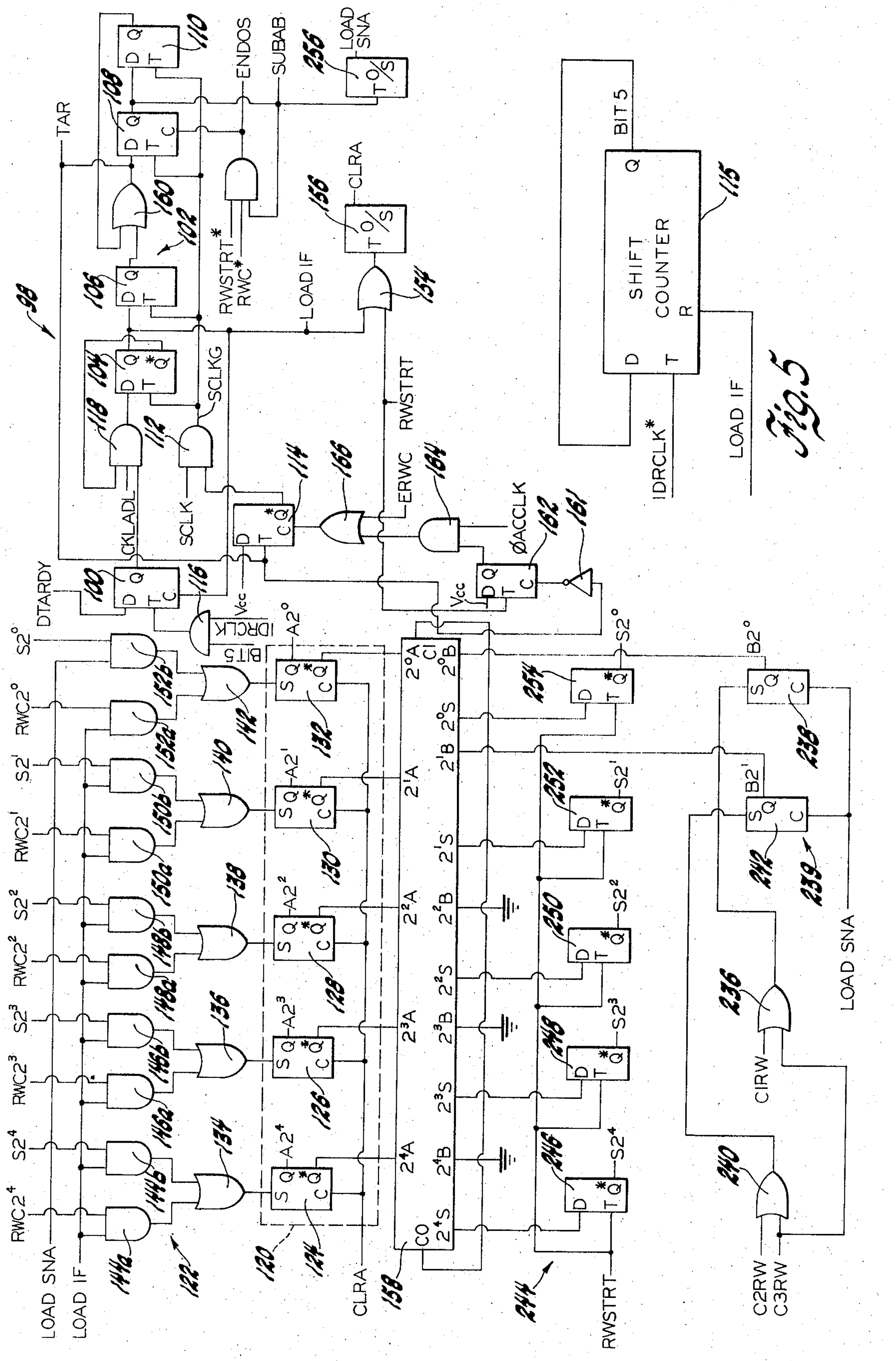

Referring now to FIG. 5, when data is available at the source 10 for entry into the register 36, a signal designated DTARDY (Data Ready) is applied to sequence control logic generally designated 98 at the D input of a flip-flop 100. Sequence logic 98 includes a counter 102 comprising flip-flops 104, 106, 108, and 110 which are toggled from a clock signal designated SCLK through an AND gate 112. The AND gate 112 is enabled from the Q* output of a flip-flop 114. SCLK operates at a frequency at least four times bit rate as may be seen in the waveform designated SCLKG in FIG. 10. The sequence logic 98 is initiated on the rising edge of IDR CLK which shifts the fifth bit of the previous word into the flip-flop 48 of the register 36. The detection of the shifting of the fifth bit into the flip-flop 48 is accomplished by a shift counter 115 which is toggled from IDR CLK* and reset from LOAD IF. When this occurs the flip-flop 100 is toggled through an AND gate 116 to enable AND gate 118. On the rising edge of the following CLKA DL a logic 1 is applied to the D input of the flip-flop 104 and on the succeeding SCLK pulse the flip-flop 104 is toggled to raise the signal LOAD IF. When LOAD IF is driven high the gates 54–62 are enabled to permit the data to be entered into the register 36. At the same time the code word associated with the data word being entered into the register 36 is entered into A register 120 through gates 122. The register 120 comprises flip-flops 124–132. Each of the flip-flops 124–132 are set from respective OR gates 134–142 which receive inputs from AND gates **144*a*–152*a* respectively or 144*b*–152*b* respectively. The individual binary digits of the code word are applied as one input to the AND gates 144*a*–152*a* the other input being LOAD IF. As shown in the sequence logic 98, LOAD IF is applied through an OR gate 154 to a one-shot 156 which produces a signal designated CLRA (Clear A Register) which is applied to the CLEAR input of the register 120. Accordingly, the register 120 is cleared and shortly thereafter the register 120 is set so that the code word appears at the Q outputs of the flip-flops 124–132.** The complement of the code word appears at the Q* outputs of the register 120 and are applied to the A input of ADDER 158. After the register 120 is loaded the flip-flop 106 of the sequence counter 102 is toggled and provides an output designated TAR (Test A Register) through an OR gate 160. When TAR is driven high it toggles the flip-flop 114 disabling the gate 112 to interrupt toggling of the counter 102. TAR also clears a flip-flop 162 through an inverter 161 enabling an AND gate 164. The other input to the gate 164 is 0AC CLK. The output of the gate 164 provides one input to an OR gate 166 having its output connected with the CLEAR input of the flip-flop 114. Accordingly, a 0AC CLK pulse following TAR clears the flip-flop 114 to enable the sequence counter 102. Once the code word is entered into the A register 120, control logic shown in FIGS. 6–7 identifies the number of redundant words and controls injection of the unique transitional pattern in the output waveform COD.

Figure 6:
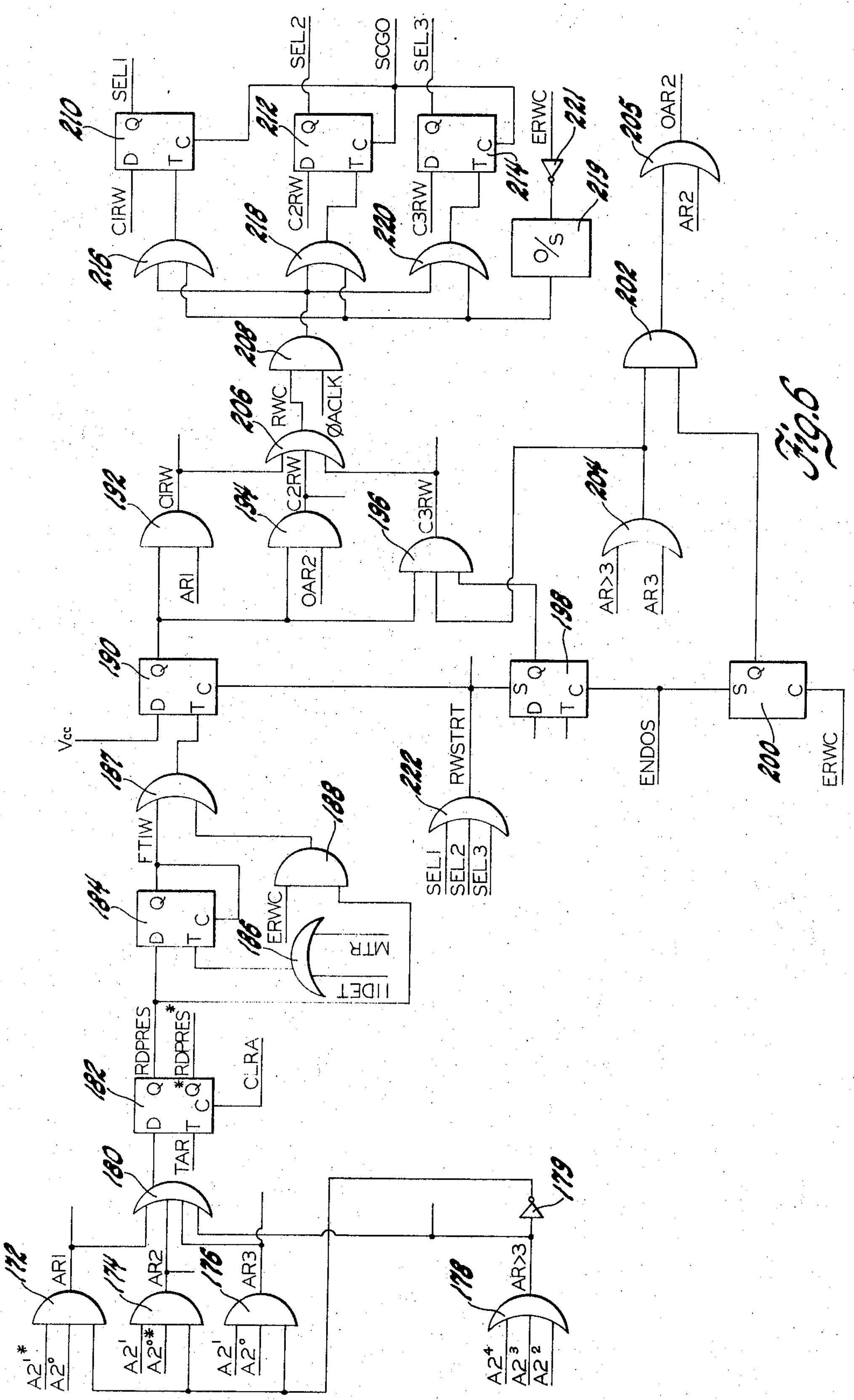

Referring now to FIG. 6, logic for determining the presence of and the number of redundant words comprises AND gates 172, 174, and 176 and OR gate 178 having inputs connected with the designated outputs of the A register 120. If the code word entered into the A register 120 is 1, 2, or 3 then the outputs designated AR1, AR2, or AR3 respectively, will be driven high. If the number of redundant words is greater than three then the output of the gate 178 designated AR > 3 will be high. The output of the gate 178 is inverted by inverter 179 to disable the gates 172, 174, and 176 when AR > 3 is high. The outputs of the gates 172–178 provide inputs to an OR gate 180, the output of which is tied to the D input of the flip-flop 182 which is toggled from TAR. If redundant data is present, one input to the gate 180 will be high and on the rising edge of TAR the flip-flop 182 will be toggled so that its Q output designated RD DRES will be driven high and will remain high until the flip-flop 182 is cleared from the signal CLRA. The Q output of the flip-flop 182 is connected with the D input of the flip-flop 184 which is toggled from an OR gate 186 having inputs connected with 11 DET and MTR. The Q output of the flip-flop 184 designated FT1W provides one input to an OR gate 187. The other input is from an AND gate 188 which is enabled from the flip-flop 182 and responds to an input designated ERWC which will be referred to hereinafter. The output of the gate 187 toggles a flip-flop 190 having its D input tied to $V_{cc}$. The Q output of the flip-flop 190 enables three AND gates 192, 194, and 196, the outputs of which are designated C1RW, C2RW, and C3RW (Code 1, 2, or 3 Redundant Words). The gate 196 is inhibited prior to the first injection of the unique transitional pattern by a flip-flop 198 which is cleared from a signal designated ENDOS (End of Sequence) which is obtained from the sequence counter 102 and will be described in greater detail hereinafter. ENDOS also sets the flip-flop 200 which enables an AND gate 202. If the number of redundant words in the A register is three or greater, one input to an OR gate 204 will be high. If the number in the A register is two, one input to an OR gate 205 will be high. Accordingly, if the number of redundant words in the A register is two or more the output of the gate 205 designated OAR2 will be high. After the first injection of the unique transitional pattern the signal designated ERWC will be driven high to clear the flip-flop 200 and disable the gate 202. The other inputs to the gates 192, 194, and 196 are respectively AR1, OAR2, and the output of the gate 204. Accordingly, if the number of redundant words in the A register is one, C1RW will be driven high, if two or more, C2RW will be driven high during the initial injection of the unique waveform and thereafter, if the number in the A register is two. After the initial injection, C3RW will be driven high if the number in the A register is three or more.

C1RW, C2RW, and C3RW provide inputs to an OR gate 206 the output of which is designated RWC. RWC and 0A CLK provide inputs to an AND gate 208 which toggles flip-flops 210, 212, and 214 through OR gates 216, 218, and 220 respectively. The other inputs to the OR gates 216, 218, and 220 is from a one-shot 219 which is triggered from ERWC through an inverter 221. C1RW, C2RW, and C3RW are connected with the D inputs of the flip-flops 210, 212, and 214 respectively. The Q output of the flip-flops 210, 212, and 214 are designated SEL1, SEL2, and SEL3 respectively. The flip-flops 210, 212, and 214 are cleared from SCGO. SEL1, SEL2, and SEL3 provide inputs to an OR gate 222 the output of which is designated RWSTRT (Redundant Word Start) which clears the flip-flop 190 and sets the flip-flop 198 thereby enabling the gate 196.

Referring again to FIG. 5, C1RW provides one input to an OR gate 236 the output of which is connected with the set input of a flip-flop 238 of a B register 239. C2RW provides one input to an OR gate 240 the output of which is connected with the set input of a flip-flop 242 of B register 239. C3RW provides a second input to each of the OR gates 236 and 240. The Q outputs of the flip-flops 238 and 242 are connected with the $B2^0$ and $B2^1$ inputs of the ADDER 158. The other B inputs of the ADDER 158 are tied to ground. The sum of the binary value stored in the A register 120 and in the B register 239 appears at the S outputs of the ADDER 158 which are tied to the D inputs of an S register 244 comprising flip-flops 246–254 which are toggled from RWSTRT. The Q* outputs of the flip-flops 246–254 provide one input to the AND gates **144*b*–152*b* in the logic 122. The other input to the gates 144*b*–152*b* is designated LOAD SNA (Load Sum in A Register). LOAD SNA is also applied to the clear inputs of the B register 239. Thus, the number of redundant words coded by the initial injection of the unique character is subtracted, i.e. added to the complement of the code word associated with the data word. The difference is then stored in the S register 244** and later entered into the A register by a signal designated LOAD SNA where the process is repeated until all redundant words are coded.

The LOAD SNA signal is derived at the output of a one-shot 256 having its input tied to the Q output of the flip-flop 108 of the sequence counter 102. When RWSTRT is driven high the A register 120 is cleared through OR gate 154 and one-shot 156. The flip-flop 182 is also cleared and the flip-flop 162 is toggled, enabling the gate 164 so that on the following 0AC CLK the flip-flop 114 is cleared through gate 166 to enable gate 112 and permit S CLK to toggle the flip-flops 104–110 driving TAR low and SUB AB and LOAD SNA high. On the next S CLK pulse TAR is driven high from the Q output of the flip-flop 110 through the gate 160 to toggle the flip-flop 114 and disable the gate 112 and to clear the flip-flop 162 through the inverter 161 thereby disabling the gate 164.

Figure 7:
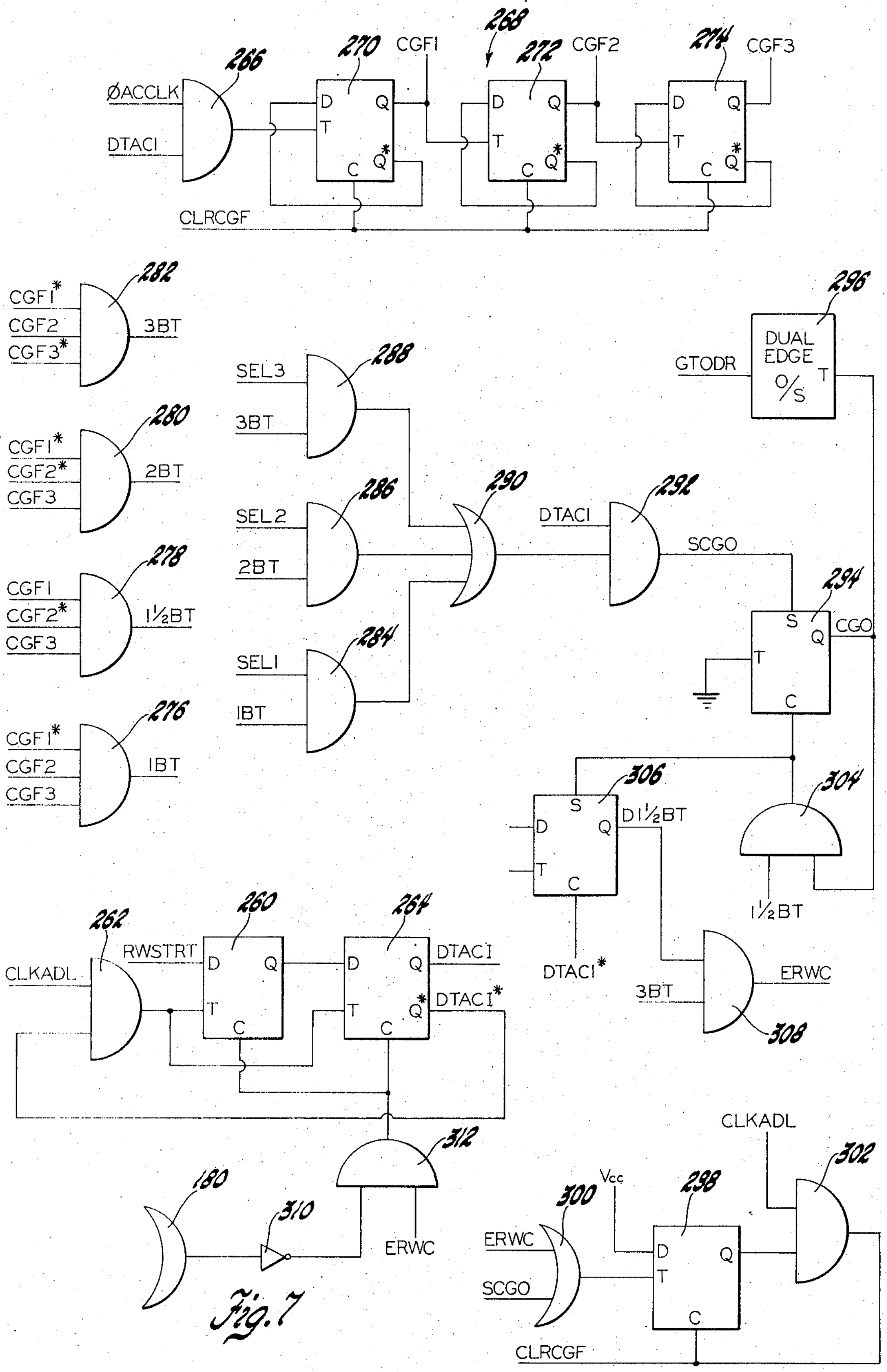

As shown in FIG. 7, RWSTRT is connected with the D input of a flip-flop 260. On the rising edge of CLKA DL the flip-flop 260 is toggled through an AND gate 262 to apply logic 1 to the D input of a flip-flop 264. On the next rising edge of CLKA DL the Q output of the flip-flop 264 designated DTACI (Data Clock Inhibit) is driven high and DTACI* is driven low to inhibit the gate 262. DTACI* also inhibits the gate 34 (FIG. 4) thereby shutting off the IDR CLK and preventing further shifting of data through the register 36 until the unique waveform has been inserted into the coded output data waveform. DTACI enables an AND gate 266 to permit toggling of a half bit time counter 268 from 0AC CLK. The counter 268 comprises flip-flops 270, 272, and 274. The Q and Q* outputs of which are appropriately connected with decode AND gates 276–282. The output of the gate 276 designated 1BT provides one input to an AND gate 284 which is enabled from SEL1. The output of the gate 280 designated 2BT provides one input to an AND gate 286 which is enabled from SEL2. the output of the gate 282 designated 3BT provides one input to AND gate 288 which is enabled from SEL3. The output of the gates 284, 286, and 288 provide inputs to an OR gate 290 the output of which provides one input to an AND gate 292. The other input to the gate 292 is DTACI. The output of the gate 292 is designated SCGO which sets a flip-flop 294, the Q output of which toggles a dual edge one-shot 296 to produce the GTODR pulses (FIG. 1). The flip-flop 294 is thus set to produce the first transition in the unique waveform at the beginning of a bit cell and delayed from the two previously coded bits by an appropriate number of bit cells depending on the number of redundant words to be coded.

As the flip-flop 294 is set by SCGO a flip-flop 298 is toggled through an OR gate 300 to enable an AND gate 302. On the rising edge of the next CLKA DL pulse the output of the AND gate 302 designated CLRCGF clears the counter 268 and the flip-flops 210, 212, and 214. When the flip-flop 294 is set an AND gate 304 is enabled. 1½ bit times after the first transition in the unique waveform the flip-flop 294 is cleared from the output of the gate 278 through the gate 304 to produce the second transition in the unique waveform 1½ bit cells after the first transition. At the same time a flip-flop 306 is set to enable an AND gate 308 the output of which is designated ERWC (End Redundant Word Coding). The other input to the gate 308 is from the output of the gate 282. Accordingly, 1½ bit times after the second transition in the unique waveform or three bit times after the first transition in the unique waveform the output of the gate 308 is driven high. When the gate 308 is driven high the counter 268 is cleared through the gate 300, flip-flop 298, and gate 302.

If all redundant words have been encoded by a single injection of the unique waveform, i.e. the code word was no greater than 2, than the output of the gates 172, 176, 178, and 180 (FIG. 6) will all be low as will the output of OR gate 180. The output of the gate 180 (FIG. 6) is inverted by inverter 310 to enable an AND gate 312. If no further redundant words are to be coded then ERWC clears the flip-flops 260 and 264 driving DTACI* high thereby disabling gate 266 and the counter 268 while enabling gate 34 and IDR CLK. If on the other hand, additional redundant words are present in the A register at the time ERWC goes high the gate 312 will be disabled. On the falling edge of ERWC the flip-flops 210, 212, and 214 are toggled through OR gates 216, 218, and 220 to store the number of redundant words to be encoded by the second injection and to enable the appropriate one of the gates 284, 286, or 288.

Figure 8:
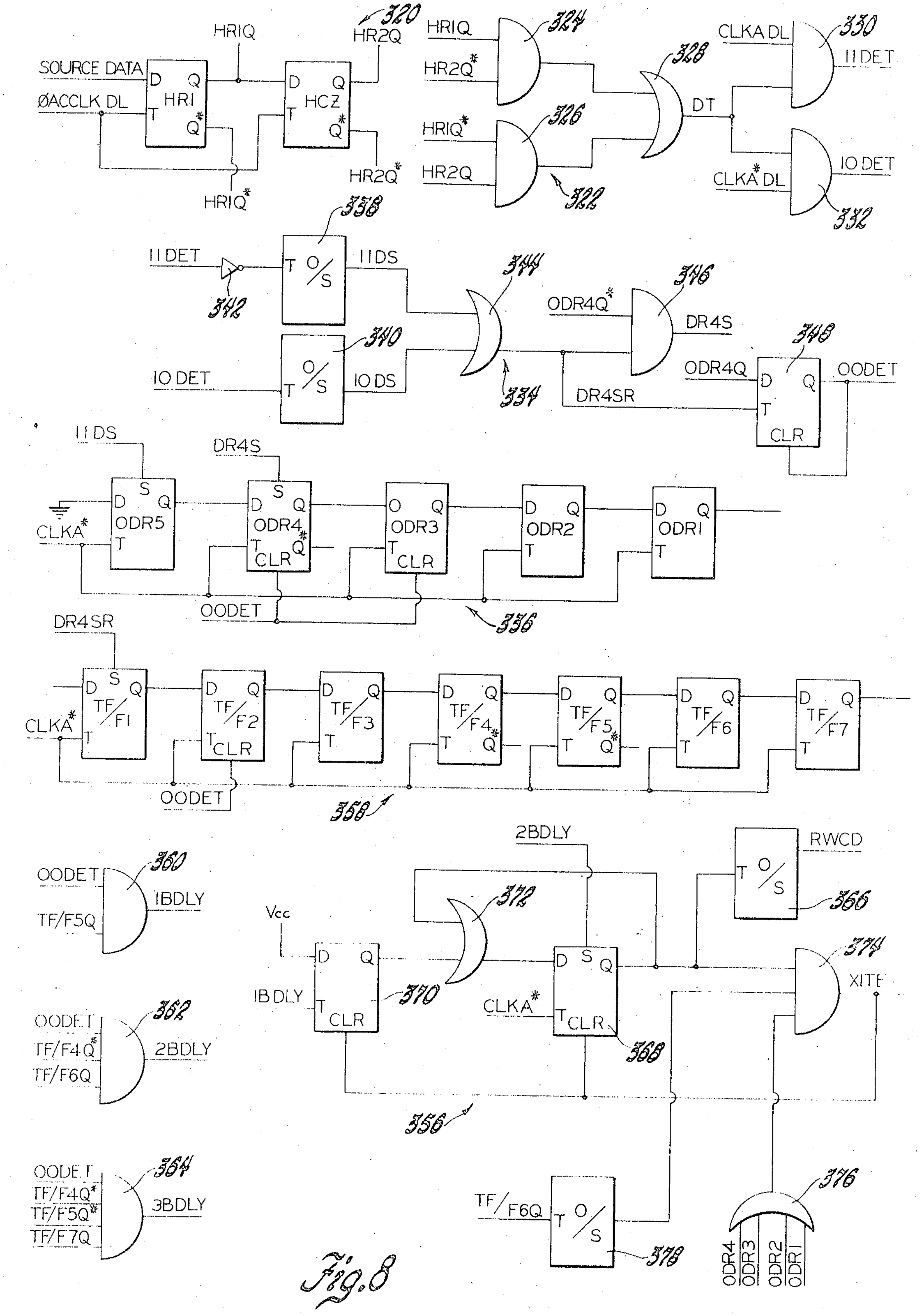
FIGS. 8 and 9 are detailed logic diagrams of the decoder of the present invention.

Referring now to FIG. 8, the decoder of the present invention is shown. The data to be decoded is applied to transition detection logic generally designated 320 for ascertaining whether transitions in the coded data represent the dibits 11 or 10. The transition detection logic comprises a two stage holding register including flip-flops HR1 and HR2 which are toggled from 0AC CLK DL. 0AC CLK DL corresponds to the leading and falling edges of CLKA* DL shown in FIG. 11. The coded data is applied to the D input of the flip-flop HR1. Anytime a transition occurs the flip-flops HR1 and HR2 will be in opposite states. The Q and Q* outputs of flip-flops HR1 and HR2 are applied to exclusive OR logic 322 comprising AND gates 324 and 326 and OR gate 328. The output of the exclusive OR logic 322 is designated DT and will consist of pulses of one-half bit time duration following each transition in the coded data. The output of the exclusive OR logic 322 is applied as one input to a pair of AND gates 330 and 332, the other inputs of which are respectively CLKA DL and CLKA* DL. If the DT pulses coincided with CLKA DL the transition represents the dibits 11. On the other hand, if the DT pulse coincides with CLKA* DL the transition represents the dibit 10. The output of the gates 330 and 332 are respectively designated 11 DET and 10 DET.

The 11 DET and 10 DET outputs of the transition detection logic 320 are applied to control logic generally designated 334 which controls a reconstruction register 336. The control logic 334 includes one-shot multivibrators 338 and 340. The one-shot 338 is toggled from 11 DET through an inverter 342 while the one-shot 340 is toggled directly from the 10 DET signal. The inverter 342 effectively delays toggling of the one-shot 338 for one-half bit time. Accordingly, toggling of the one-shots 338 and 340 occur at the same time relative to bit time. The outputs of the one-shot 338 and 340 designated respectively 11 DS and 10 DS are applied to an OR gate 344 to produce the signal designated DR4SR. The register 336 comprises flip-flops ODR5, ODR4, ODR3, ODR2, and ODR1, which are toggled from CLKA*. The D input to ODR5 is tied to ground and ODR5 is set from 11 DS. ODR4Q* is AND'ed with DR4SR in an AND gate 346 to provide the signal DR4S which is applied to the set input of ODR4. A flip-flop 348 has its D input tied to ODRQ4 and is toggled from DR4SR. The Q output of the flip-flop 348 is designated 00 DET and is connected with the CLEAR input of the flip-flop 348 and also to the CLEAR input of the flip-flops ODR4 and ODR3. When a transition occurs which represents the dibit 11, ODR5 is set from 11 DS and since ODR4Q* is normally high the 11 DS pulse produces a DR4S pulse through AND gate 346 to set the flip-flop ODR4. The dibit 11 is thus reconstructed in the flip-flops ODR5 and ODR4. A transition representing the dibits 10, i.e. a transition at the middle of the bit cell, produces a 10 DS pulse which in turn produces a DR4S pulse to set the flip-flop ODR4. Thus, a 1 is stored in ODR4 and a 0 is stored in ODR5. It will be recalled that three consecutive 0's are encoded by a transition at the beginning of the bit cell containing the first 0 and at the middle of the bit cell containing the second 0. The first transition of this unique waveform is interpreted as a transition associated with the dibit 11 and, accordingly, the flip-flops ODR5 and ODR4 are set. One bit time later the dibit 11 is shifted into ODR4 and ODR3. Accordingly, ODR4Q* is low disabling the gate 346 and the D input of the flip-flop 348 is high. Thus, when the mid-transition occurs the resulting 10 DS toggles the flip-flop 348 through the OR gate 344 and clears ODR4 and ODR3 so that the three 0's represented by the unique waveform are stored in ODR5, ODR4, and ODR3.

It will be recalled that the unique waveform consisting of an edge transition followed by a mid-transition 1½ bit times later is also used to identify redundant data. The decoding logic thus far described is essentially the same as that disclosed in copending application Ser. No. 404,231, and does not distinguish between the unique waveform representing the three bit configuration 000 and the unique waveform representing redundant data. Accordingly, the unique waveform representing redundant data is interpreted as the three bit configuration 000. In order to identify the real data words the output of the register 336 is applied to a register 350 (FIG. 9) which is toggled from CLKA through an AND gate 352. The output of the gate 352 is designated PORC. The AND gate 352 is controlled from a flip-flop 354 which is set to disable the gate 352 by a signal designated RWCD and is cleared to enable the gate 352 by a signal designated XITE. Returning to FIG. 8, the signals RWCD and XITE are obtained from control logic generally designated 356 which identifies those unique waveforms in the coded data representing redundant words and identifies the number of redundant words based on the time of occurrence of the unique waveform relative to a transition representing real data.

The logic 356 includes a counter 358 comprising flip-flop TF/F1 – TF/F7 which are toggled from CLKA*. Each time a transition occurs in the coded data, TF/F1 is set by DR4SR. If a mid-transition occurs 1½ bit cells after an edge transition the logic 1 in TF/F2 resulting from the edge transition is cleared by the 00 DET. A logic 1 is shifted through the counter 358 in response to a transition representing the dibits 11 or 10. The location of the logic 1 associated with the dibits 11 and 10 in the counter 358 at the time of occurrence of a 00 DET can be utilized to distinguish between the unique waveforms representing 000 and those representing redundant words. If the unique waveform represents 000 the previous transition would necessarily have occurred no greater than 3½ bit cells prior to the mid-transition of the unique waveform so that when 00 DET occurs, TF/F4Q will be high. If instead TF/F5Q is high at the time of occurrence of the mid-transition of the unique waveform then the unique waveform has been delayed by one bit cell and, therefore, represents one additional word of data. Similarly, if TF/F6Q or TF/F7Q is high at the time of occurrence of the mid-transition of the unique waveform then the unique waveform has been delayed by 2 and 3 bit cells, respectively, and represents two and three additional words of data respectively. The AND gates 360, 362, and 364 each respond to 00 DET as well as TF/F5Q, TF/F6Q, and TF/F7Q respectively, to detect the one, two, or three bit delays. Gates 362 and 364 are inhibited whenever TF/F4Q is high since if 00 DET occurs while TF/F4Q is high the unique waveform represents 000 regardless of the state of TF/F6 or TF/F7.

The counter 350 (FIG. 9) comprises flip-flops DOB-1–DOB5 which are toggled by the signal PORC. The D input to the flip-flop DOB1 is from the Q output of the flip-flop ODR1. When the first two bits which precede the unique waveform and attendant delays are shifted from the register 336 into the register 350, it is necessary to interrupt PORC so that the following 0's in the register 336 reconstructed as a result of the unique waveform and its attendant delays are not introduced into the register 350. This is accomplished by setting the flip-flop 354 thereby disabling the gate 352. The signal RWCD which sets the flip-flop 354 is derived from a one-shot multivibrator 366 (FIG. 8) which is toggled from a flip-flop 368. The flip-flop 368 has its D input connected with the Q output of a flip-flop 370 through an OR gate 374. The other input to the gate 372 is the Q output of the flip-flop 368. The flip-flop 370 has its D input connected to $V_{cc}$ and is toggled from 1BDLY. The flip-flop 368 is set from 2BDLY. This logic disables the clock signal PORC after the last bit of real data has been entered into the register 350. While the PORC signal is disabled the data set in the register 336 in response to the unique character and the associated delays identifying the number of redundant words is shifted out of the register 336 by CLKA*. The PORC signal must be enabled again when the first bit of real data following the unique waveform appears in the flip-flop ODR1 of the register 336. When the number of redundant words have been identified, a transition associated with real data will occur within 4½ bit times after the mid-transition of the unique waveform. The second transition of the waveform places a logic 1 in TF/F1. By the time this logic 1 appears at the Q output of TF/F6 a 1 will occur in either ODR1, ODR2, ODR3, or ODR4, if the total number of redundant words has been identified. At this time it is necessary to clear the flip-flop 354 thereby enabling the gate 352 so that the data in the register 336 will be entered in the register 350. The flip-flop 354 is cleared from a signal designated XITE which is derived from an AND gate 374 having one input connected with the Q output of flip-flop 368, a second input connected with an OR gate 376 having inputs connected with ODR-1–ODR4 and a third input connected with the output of a one-shot 378 which is toggled from TF/F6. The signal XITE is also utilized to clear the flip-flops 368 and 370. Each time a real bit of data is shifted into the register 350 it is counted by a counter 371 which is clocked from PORC through an inverter 373. When a complete word of data is shifted into the register 350, i.e. after the counter 371 has reached a count of 5, a signal designated DDTARDY (Decoded Data Ready) is raised and the counter 371 is reset on CLKA* DL through an AND gate 375.

The number of bit delays associated with the unique waveform are accumulated during the decoding process to identify the number of redundant words associated with a particular data word. This is accomplished by logic generally designated 377. The logic 377 comprises an A register 379, a B register 380, and an ADDER 382. Initially, both the A and B registers are cleared. When a delay is associated with the detection of the unique waveform the number of bits by which the unique waveform is delayed is entered into the A register 379 and is added to that of the B register 380 by the ADDER 382, and subsequently stored in the B register 380. This process is continued until all delays have been accumulated. When the last bit of the data is shifted into the register 350 and the signal DDARDY is driven high the data word comprising the bits in DOB1–DOB5 as well as the number of redundant data words as defined by the bits at the output of the ADDER 382 are loaded into the data storage or utilization device 28.

The A register 379 includes flip-flops A1 and A2 and the B register 380 includes flip-flops B1, B2, and B4. The B register 380 may include additional stages depending on the degree of redundancy expected in the data. For the purpose of explaining the invention only three stages are required. The flip-flop A1 is set by the signal 1BDLY (FIG. 8) through an OR gate 384 and is cleared by the signal 2BDLY. The flip-flop A2 is set by the signal 2BDLY through an OR gate 386 and cleared by the signal 1BDLY. Both A1 and A2 are set by the signal 3BDLY through the gates 384 and 386 respectively. The flip-flops A1 and A2 are toggled through an inverter 398 to clear the contents of the A register 379 following a DDTARDY signal. Shortly thereafter, the B register is cleared through an AND gate 400 on CLKA DL. The Q output of the A register and B register provide inputs to the ADDER 382 so that the summed outputs of the A and B register appear at the S lines of the ADDER 382. The contents of the ADDER 382 are applied to the D inputs of the B register 380 and are shifted into the B register on CLKA* DL under the control of an AND gate 402. One input of the gate 402 is enabled in response to either the signals 1BDLY, 2BDLY, or 3BDLY through an OR gate 404 which clears a flip-flop 406. The other input to the gate 402 is enabled from a flip-flop 408 which is toggled from CLKA and has its D input tied to the Q outputs of the flip-flops A1, A2 through an OR gate 410. The flip-flop 406 is set and the flip-flop 408 is cleared in response to a pulse which toggles the B register 380.

The overall operation of the encoder of the present invention will be described with reference to the various waveforms shown in FIG. 10 and the logic shown in FIGS. 4–8. The waveforms in FIG. 10 show the coding of six, five bit words of data having the bit configuration 10011 (reading left to right in relation to the data bits DTAB1–DTAB5 exiting the source 10) followed by two, five bit data words of the bit configuration 00011. Just prior to entry of a data word into the register 36 the Q output of each of flip-flops 38–46 is high. Assuming that data from the source 10 is ready to be encoded, the DTARDY signal will be high. Just prior to shifting the last bit of the previous data into the flip-flop 46 of the register 36 (on the falling edge of IDR CLOCK), the shift counter 80 is toggled to raise BIT5. On the rising edge of IDR CLOCK the last bit of the previous data is shifted into the flip-flop 46 and the flip-flop 100 in the sequence logic 98 is toggled to enable the AND gate 118. The next rising edge of CLKA DL raises the D input of flip-flop 104 so that on the following SCLK pulse the flip-flop 104 is toggled to raise LOAD IF. LOAD IF resets the counter 80 and permits the data word to be loaded into the register 36 and toggles the one-shot 156 producing a CLRA pulse of very short duration which clears the A register 120. When CLRA is removed from the register 120 the binary code for the number of redundant data words is entered into the register 120. As the binary code for five redundant words of data is entered into the register 120 the signal AR>3 goes high and raises the D input of the flip-flop 182. As LOAD IF goes high the flip-flop 100 is cleared to lower the D input of flip-flop 104 so that on the following SCLK pulse, LOAD IF is driven low and TAR is driven high to disable the gate 112 and release the clear input to the flip-flop 162. The rising edge of TAR toggles flip-flop 182 to raise RD PRES indicating that redundant data is present.

As the first two bits of data are shifted into the flip-flops 48 and 50 the dibit 10 is detected raising the signal 10 DETECT which in turn raises the signal MTR. MTR toggles the flip-flop 184 to raise the signal FTIW. FTIW clocks the flip-flop 190 to raise the signal C2RW. C2RW sets the flip-flop 242 in the B register 239 to raise the signal $B2^1$. With MTR high the following falling edge of IDRCLK raises MTC which toggles the one-shot 94 which in turn toggles the flip-flop 18 to produce a transition in the COD waveform.

With C2RW high the following 0A CLK toggles the flip-flop 210, 212, and 214 to raise the signal SEL2 which raises RWSTRT. RWSTRT clears the flip-flop 190 lowering C2RW and also sets the flip-flop 198 enabling the gate 196 to permit subsequent coding of three redundant words. RWSTRT also toggles the one-shot 156 momentarily raising CLRA and toggles the flip-flop 162 to enable the AND gate 164. RWSTRT also toggles the S register 244 to store the output of the adder 158. This raises the $S2^0$ and $S2^1$ signals indicating that three redundant words remain to be coded. on the 0AC CLK following the rising edge of RWSTRT, the flip-flop 114 is cleared through gages 164 and 166 to enable the gate 112. The following SCLK pulse lowers TAR and raises SUB AB to toggle the one-shot 56 and produce a LOAD SNA pulse. The LOAD SNA pulse clears the B register 239 and loads the contents of the S register 244 into the A register 120. The A register 120 will now indicate that three redundant words remain to be coded. This information will be supplied to the A inputs of the ADDER 158. AR3 is raised so that the high input is applied to the D input of the flip-flop 182. On the next SCLK, TAR is driven high and clocks the flip-flop 182 to raise RD PRES. With TAR high the gate 112 is disabled to inhibit further clocking of the sequence logic 98.

On the rising edge of the second CLKA DL pulse following the rise of RWSTRT, DTACI is driven high to inhibit IDR CLK and prevent further shifting of data in the register 36 until the unique character has been entered into the COD waveform. At this point the first bit of data has been shifted out of register 36. The rising edge of DTACI enables gates 266 and 292 and releases the clear input on the flip-flop 306. Once the gate 266 is enabled the counter 268 is clocked from 0ACCLK at twice bit rate to produce in conjunction with the gates 276–282 the waveforms 1BT, 1½BT, 2BT, and 3BT. The rising edge of 2BT coincides with the termination of the fourth bit cell of the coded output data. Since SEL2 is high, 2BT causes SCGO to rise and set the flip-flop 294 which toggles the dual edge one-shot 296 to produce a transition in a COD waveform at the beginning of bit cell 5. SCGO also clears the flip-flops 210, 212, and 214 driving SEL2 low which in turn drives RWSTRT low. SCGO also toggles the flip-flop 298 so that on the following CLKA DL pulse the counter 268 is cleared. 1½ bit times later the flip-flop 294 is cleared causing another transition in the COD waveform and the flip-flop 306 is set to enable the gate 308. 1½ bit times later the signal 3BT rises driving ERWC high. Since RD PRES is high at the time ERWC goes high the flip-flop 190 is toggled through the gates 188 and 187 and raises the C3RW output of the gate 196. C3RW sets the output of the B register 239 to a binary 3 through the gates 236 and 240 thereby raising the D inputs to the flip-flops 252 and 254 of the S register 244. ERWC also enables the gate 302 through the gate 300 and the flip-flop 298 so that on the following CLKADL pulse the counter 268 is cleared driving ERWC down. On the falling edge of ERWC the one-shot 219 is triggered to toggle the flip-flops 210, 212, and 214 thereby raising SEL3. SEL3 raises RWSTRT through the gates 222 which clears the flip-flop 190 driving C3RW low. The rising edge of ERWC also clears the flip-flop 114 through the gate 166 to enable the sequence logic 98. RWSTRT toggles the S register 244 driving $S2^0$ and $S2^1$ low. RWSTRT also triggers the one-shot 156 through the gate 154 to raise CLRA which clears the flip-flop 182 driving RD PRES low and clears the A register 120 driving AR3 low. With the sequence logic 98 enabled, SCLK drive TAR low and SUB AB high to trigger the one-shot 256 which clears the B register 239 and loads the output of the S register 244 into the A register 120. The $A2^0$ – $A2^4$ outputs of the A register 120 are thus 0.

Since AR3 was high at the time ERWC went high the gate 312 was disabled so that after the counter 268 is cleared it begins counting again from 0AC CLK. Since SEL3 is high, SCGO will be driven high, when 3BT goes high which sets the flip-flop 294 producing a transition in the COD waveform at the beginning of bit cell 11 of the COD waveform. After 1½ bit times a transition is produced in the COD waveform at the middle of bit cell 12 in the manner previously described. 1½ bit times later ERWC is raised in the manner previously described. Since $A2^0 - A2^4$ are low at this time, the output of the gate 180 is low and the gate 312 is enabled so that when ERWC goes high the flip-flops 260 and 264 are cleared driving DTACI low to prevent further clocking of the counter 268 and to disable the gate 292 and enable the gate 34 to permit clocking of the register 36. ERWC also enables the sequence logic 98. SCLK then drives TAR low and SUB AB high. Since RWSTRT* and RWC* are high, SUB AB drives ENDOS high. ENDOS clears the flip-flop 108 and the sequence logic 98 so that TAR remains low during subsequent clocking of the sequence logic 98 by SCLK.

As the BIT5 output of the shift counter 80 is raised by the falling edge of IDRCLK, the sequence logic 98 is initiated. As the last two bits of the first word are shifted into the flip-flops 48 and 50, 11 DET is raised which raises ETC and produces the transition in the COD waveform at the beginning of bit cell 15 of the COD waveform. LOAD IF is driven high in the middle of bit cell 15 of the COD waveform and loads the next word to be coded into the register 36 and also loads the binary code with a number of additional words which are identical with the data word. Since the number of redundant words is one, AR1 is driven high. As the data is further shifted through the register 36, 00 DET will be driven high so that the counter 72 will subsequently drive ETR and MTR high producing transitions at the beginning of bit cell 17 and the middle of bit cell 18 of the COD waveform. MTR also drives FTIW high. The redundant word character generator 14 responds to FTIW in the manner previously described to insert the unique waveform consisting of a transition at the beginning of bit cell 21 and the middle of bit cell 22 of the COD waveform. The insertion of the waveform is delayed by one bit cell, i.e. bit cell 20 of the COD waveform. Since the dibit 11 immediately follows 000 a transition is provided at the beginning of bit cell 24 of the COD waveform.

Figure 9:
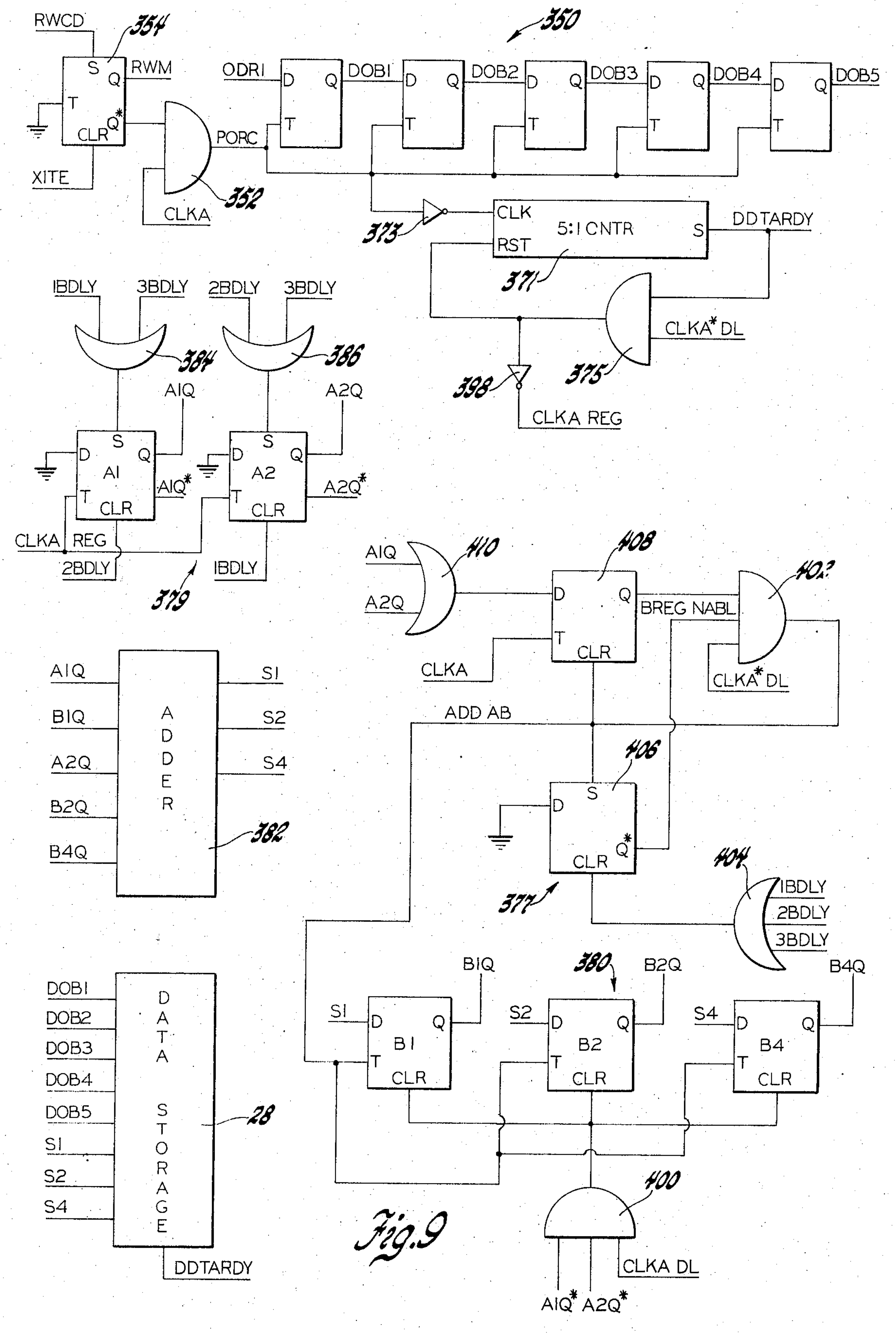
Figure 11:
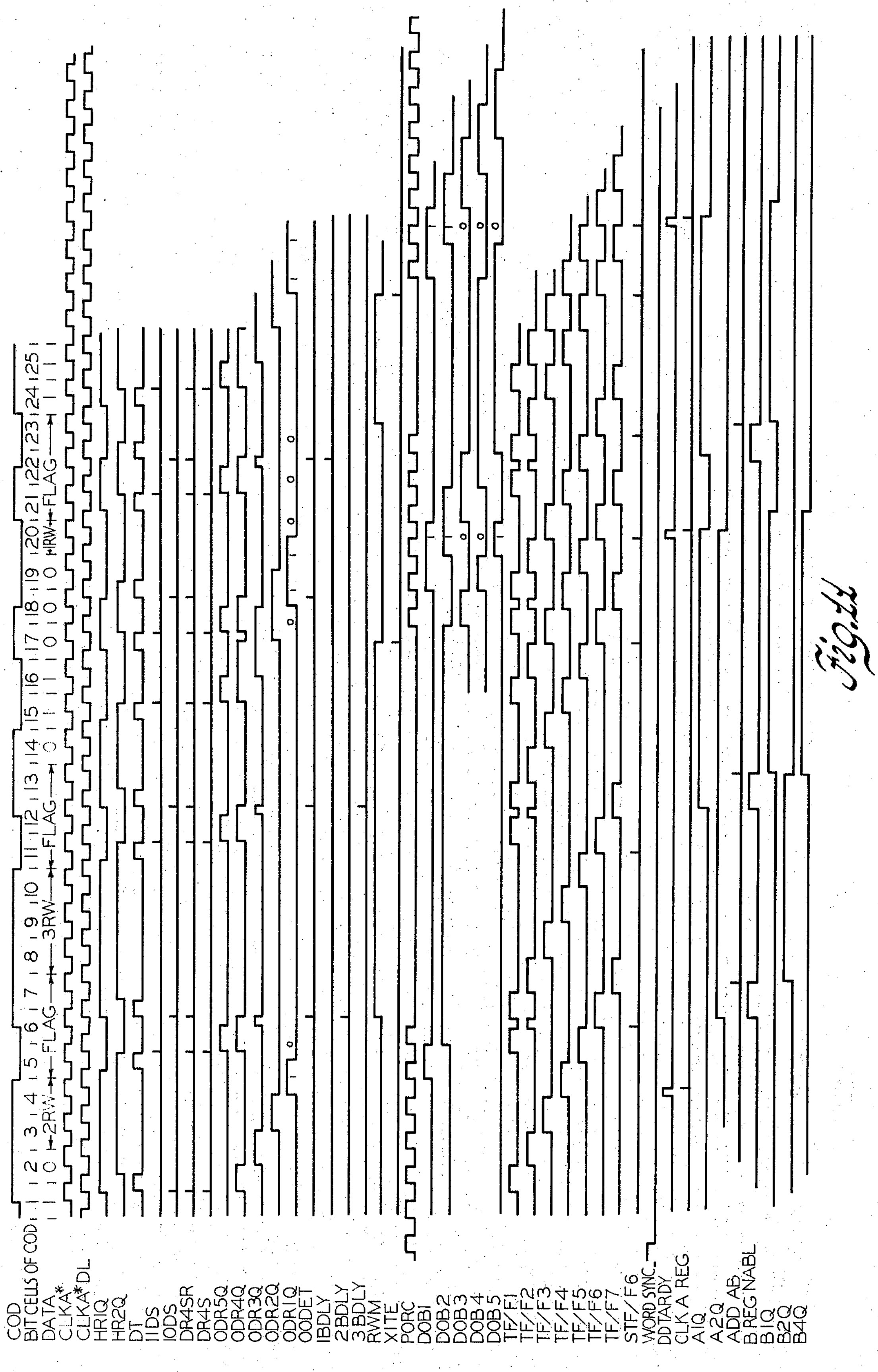

The overall operation of the decoder of the present invention will be described with reference to the various waveforms shown in FIG. 11 and the logic shown in FIGS. 9 and 10. The encoded data as represented by the COD waveform produced by the encoder of the present invention is shifted through the holding register comprising flip-flops HR1 and HR2 by 0AC CLKDL to produce the HR1Q and HR2Q waveforms shown. The HR2Q waveform is delayed from the HR1Q waveform by ½ bit cell, since 0AC CLKDL is a twice bit rate clock. A transition in the COD waveform causes the flip-flop HR1 and HR2 to be placed in opposite states. This is detected by the exclusive OR logic 322 to produce the pulses designated DT. If the DT pulses are aligned with CLKA* DL, a 10 DS pulse is produced, and if the DT pulse is aligned with CLKA DL a 11 DS pulse is produced. Each 11 DS pulse and 10 DS pulse produces a DR4SR pulse. If ODR4Q is low when a DR4SR pulse occurs, a DR4S pulse will be produced. On the other hand, if ODR4Q is high when a DR4SR pulse occurs, a 00 DET pulse will be produced which will clear ODR4 and ODR3 in the reconstruction register 336. Accordingly, a transition at the middle of bit cell 1 of the COD waveform produces a DR4S pulse which sets ODR4Q high. As CLKA* clocks the register 336 a 1 followed by a 0 is shifted out of the register 336 and into the register 350 by PORC. The transition at the beginning of bit cell 5 of the COD waveform produces a 11 DS which sets ODR5Q and ODR4Q. However, the transition at the middle of the bit cell 6 of the COD waveform produces a DR4SR pulse while ODR4Q is high thereby producing the 00 DET pulse which clears ODR4 and ODR3. The data set into the register 336 as a result of the transition at the beginning of bit cell 11 of the COD waveform is cleared by the 00 DET which is produced by the transition at the middle of bit cell 12 of the COD waveform. The transition at the beginning of bit cell 15 of the COD waveform causes a pair of 1's to be set into ODR4 and ODR5. The data entered into the register 336 as a result of the transition at the beginning of bit cell 17 of the COD waveform is cleared by the transition which occurs at the middle of bit cell 18. Similarly, the data set into the register 338 by the transition at the beginning of bit cell 21 is cleared by the transition which occurred at the middle of bit cell 22. The transition at the beginning of bit cell 24 sets the flip-flops ODR4 and ODR5. The TF/FI – TF/F6 waveforms show TF/FI being set on each DR4SR pulse and TF/F2 being cleared on each 00 DET pulse. Since TF/F4Q is low and TF/F6Q is high at the time of the occurrence of a 00 DET pulse during bit cell 6 of the COD waveform, 2BDLY is raised to set the flip-flop 368 which toggles the one-shot 366 which in turn sets the flip-flop 354 driving RWM high to disable PORC. The string of 0's exiting the register 336 corresponding to bit cells 3–13 are thus not entered into the register 350. During this interval of time the bit cell delays preceding the unique word or flag are accumulated in the ADDER 382 and loaded into the B register 380. The two BDLY entered into the ADDER 382 raises the S2 output of the ADDER 382. The 2 BDLY pulses also raise A2Q in the A register 376 which clears the flip-flop 406 through the gate 404 to raise BREG NABL. On the following CLKA pulse the flip-flop 408 is toggled to raise ADD AB which clears the flip-flop 408, sets the flip-flop 406, and toggles the B register 380 raising B2Q. The 00 DET pulse occurring during bit cell 12 of the COD waveform produces a 3BDLY pulse which sets the A1 and A2 flip-flops in register 378 driving A1Q high while A2Q remains high. With the B2Q and A1Q and A2Q inputs to the ADDER 382 high the S4 and S1 outputs of the ADDER 382 will be high. The ADD AB pulse occurring on the rising edge of CLKA*DL toggles the B register 384 driving B1Q high, B2Q low, and B4Q high.

During bit cell 17 of the COD waveform TF/F6Q toggles the one-shot 378 producing an STF/F6 pulse. Since at this time ODR3 and ODR4 are high the gate 374 is enabled from the gate 376. Accordingly, the STF/F6 pulse generates an XITE pulse which clears the flip-flop 354 thereby enabling gate 352 and permitting PORC to toggle the register 350. After the fifth bit of the first word is entered into the register 350 on the falling edge of PORC, DDTARDY Is raised to enter the data bits DOB1–DOB5 and the output of the B register, B1Q, B2Q, and B4Q into the data storage device 28. DTARDY enables the gate 374 so that on the rising edge of CLKA*DL, the counter 370 is reset and the A register is clocked causing A1Q and A2Q low thus enabling the gate 400 so that on the falling edge of CLKA*DL the B register is cleared.

The three 0's s in bit cells 17, 18, and 19 represented by the transitions at the beginning of bit cell 17 and the middle of bit cell 18 of the COD waveform are shifted through the register 336 and entered into the register 350. The 00 DET resulting from the transitions at the beginning of bit cell 21 and the middle of bit cell 22 produces a 1BTLY pulse which toggles the flip-flop 370 and raises the D input of the flip-flop 368. On the following CLKA* pulse the flip-flop 368 is toggled to raise RWM and disable PORC. The 1BDLY pulse causes A1Q to rise which raises BREGNABL so that on CLKA*DL the output of the ADDER 382 is entered into the B register 380 driving B1Q high. When TF/F6 goes high, one of the inputs to the gate 376 are high, i.e. ODR1Q–ODR4. so that an XITE pulse is produced which clears the flip-flop 354 enabling PORC. As the last bit of data of the second word is entered into the register 350, DDTARDY is raised to enter the contents of the B register and data bits DOB1–DOB5 into the storage device 28.

Having thus described my invention what I claim is:

1. Data compression apparatus comprising:

a source of binary data providing a data word and an accompanying code word identifying the number of additional data words which are identical within a predefined tolerance with the data word, first logic means responsive to said data word for providing a coded bistable output signal containing transitions between two separately identifiable states of said output signal at the beginning or middle of selected ones of bit cells containing the bits of said data word to thereby code both the binary character of the bit in the selected one of the bit cells and the bit in the bit cell immediately following said selected bit cells, said first logic means responding to those bits in said data word of one binary characterization by providing a transition at the beginning or middle of each corresponding bit cell depending upon whether said corresponding bit cell is immediately followed by a bit cell containing a bit of said one binary characterization or the other binary characterization respectively, whereby the shortest interval between transitions is 1½ bit cells and occurs between a transition at the middle of the bit cell which is followed by a transition at the beginning of a bit cell, redundant word character generating means for generating a three bit cell transitional pattern containing a transition at the beginning of a bit cell followed by a transition at the middle of the next bit cell, control logic means responsive to said code word and the production of a transition by said first logic means for disabling said first logic means and for enabling said character generating means to insert said transition pattern in said output signal delayed from the end of the bit cell immediately following said selected bit cell by one bit cell, if the number of additional data words is one and by 2 bit cells if the number of additional data words is two or more, said character generating means inserting successive transitional patterns delayed from the previous pattern by a minimum of 1 bit cell and a maximum of 3 bit cells until the total number of bit cell delays corresponds to the number of additional data words, said control means disabling said character generating means and enabling said first logic means in response to the insertion of the last of said transitional patterns.

2. Data compression apparatus comprising:

a source of binary data providing a data word and an accompanying code word identifying the number of additional data words which are identical within a predefined tolerance with the data word, clock means for establishing a plurality of bit cell intervals of substantially uniform time durations, first logic means responsive to said clock means and to said data word for providing a coded bistable output signal containing transitions between two separately identifiable states of said output signal at the beginning or middle of selected ones of the bit cells containing the bits of said data word to thereby code both the binary character of the bit and the selected one of the bit cells and the bit in the bit cell immediately following said selected bit cells, said logic means responding to those bits of said data word of one binary characterization by providing a transition at the beginning or middle of each corresponding bit cell depending upon whether said corresponding bit cell is immediately followed by a bit cell containing a bit of said one binary characterization or the other binary characterization, respectively, whereby the shortest interval between transitions is 1½ bit cells and occurs between a transition at the middle of a bit cell which is followed by a transition at the beginning of a bit cell, said first logic means responding to three consecutive bits of uncoded data in said data word of said other binary characterization by providing a transition at the beginning of the bit cell containing the first of said three consecutive bits and at the middle of a bit cell containing the second of the three consecutive bits to thereby code said three consecutive bits whereby the maximum interval between transitions is 4½ bit cells;

redundant word character generating means for generating a 3 bit cell transitional pattern containing a transition at the beginning of a bit cell followed by a transition at the middle of the next bit cell;

control logic means responsive to said code word and the production of a transition by said first logic means for disabling said first logic means and for enabling said character generating means to insert said transitional pattern in said output signal delayed from the end of the bit cell containing the last bit identified by the transition produced by said first logic means by 1 bit cell if the number of additional data words is one, and by 2 bit cells if the number of additional data words is two or more, said character generating means inserting successive transitional patterns delayed from the previous pattern by a minimum of 1 bit cell and a maximum of three bit cells until the total number of bit cell delays corresponds to the number of additional data words, said control means disabling said character generating means and enabling said first logic means after insertion of the last of said transitional pattern.

3. Apparatus for decoding a bilevel signal containing transitions at the beginning or middle of selected ones of the succession of arbitrarily defined bit cell intervals comprising:

formulation register means;

first logic means for detecting the occurrence of a pair of transitions in said signal during a 3 bit cell interval, the first transition of which occurs at the beginning of the first bit cell of the interval and the second of which occurs at the middle of the second bit cell of the interval;

second logic means responsive to the detection of the remaining transitions in said signal for entering a binary 1 in said register means during the bit cell interval containing the transition and for entering a binary 1 or a binary 0 during the following bit cell interval depending upon whether the transition occurs at the beginning or middle of the bit cell;

third logic means responsive to the detection of those of said pairs of said transitions the first of which occurs within 2 bit cells following one of said remaining transitions for entering the three bit configuration 000 in said register means;

means responsive to the remaining ones of said pairs of transitions during a predetermined number of bit cells constituting the length of a data word, the number of bit cell intervals by which the first of the pair of transitions of said remaining ones exceed said 2 bit cell interval and for detecting the number of bit cell intervals between successive ones of the 3 bit cell intervals containing said remaining ones of said pairs of transitions;

and means for storing the data entered into said register means and the associated number of accumulated bit cell intervals.

4. Data compression apparatus for generating a bilevel signal which is suitable for transmitting through or recording on a communication medium the bilevel signal being divided into a plurality of bit cells of substantially equal time duration and containing transitions separated by a minimum of 1½ bit cells and a maximum of 4½ bit cells, said apparatus comprising:

a source of binary data for providing data words and an accompanying code word identifying a number of additional data words which are identical within a predefined tolerance with the data word;

encoder means including bit pair comparator means responsive to adjacent uncoded bits of a data word, said bit pair comparator means responsive to a pair of adjacent bits which have not previously been encoded and which form a first of the four possible two bit configurations by producing a toggle pulse at the beginning of the bit cell containing the first bit of said first two bit configuration, said bit pair comparator means responsive to a pair of adjacent bits which have not previously been encoded and which form a second of the four possible two bit configuration, the second bit of which is the complement of the second bit of said one of the four possible two bit configurations, by producing a toggle pulse at the middle of the bit cell containing the first bit of said second two bit configuration whereby each toggle pulse from said bit pair comparator means identifies two bits of binary data and toggle pulses are separated by a minimum of 1½ bit cells, said encoder means including additional comparator means responsive to three consecutive bits of said data word which have not previously been encoded, each bit of which is the complement of the second bit of said first two bit configuration by producing a first toggle pulse at the beginning of the bit cell containing the first of said three consecutive bits and a second toggle pulse at the middle of the bit cell containing the second of said three consecutive bits, whereby the maximum interval between a toggle pulse produced by said bit pair comparator means and a toggle pulse produced by said additional comparator means is 4½ bit cells, redundant word character generator means responsive to a code word of one or more for disabling said encoder means in response to the first toggle pulse from said bit pair comparator means on said second toggle pulse from said additional comparator means and for subsequently generating one or more pairs of toggle pulses, the first of which occurs at the beginning of a bit cell and the second of which occurs at the middle of the following bit cell, the first toggle pulse of the first of said pair of toggle pulses being delayed from the previous toggle pulse by at least 1½ bit cells plus 1 bit cell if said code word is one and 2 bit cells if said code word is two or more, the first toggle pulse of subsequent ones of said pairs of toggle pulses being delayed from the second of a previous pair of toggle pulses by 1½ bit cells plus a minimum of 1 cell and a maximum of 3 bit cells until the total of the added bit cell delays equal the code word number;

means including a toggle device responsive to a toggle pulse from said encoder means or said redundant word character generating means for producing said bilevel signal, said redundant word character generating means enabling said decoder means 1½ bit cells after the second of the final pair of toggle pulses.

5. Apparatus for decoding a bilevel signal containing transitions at the beginning or middle of selected ones of a succession of arbitrarily defined bit cell intervals comprising:

a first multistage register;

means including first clock means for shifting data through said first register means and for normally entering a binary 0 in the first stage of said first register means;

first logic means responsive to a transition in said output signal at the beginning of a bit cell for entering a binary 1 in the first and second stages of said first register means, second logic means responsive to a transition in said output signal at the middle of a bit cell and the absence of a transition in the previous bit cell for entering a binary 1 in the second stages of register means;

third logic means for detecting a transitional pattern in said signal including a first transition at the beginning of a bit cell which is followed by a second transition at the middle of the following bit cell for clearing the data in said second and third stages of said register means in response to the second transition in said transitional pattern;

a second multistage register means;

second clock means for entering the data exiting said first register means into said second register means;

clock control means responsive to the detection of said transitional pattern at a bit time interval delayed from a first predetermined reference interval for disabling said second clock means until the expiration of a second predetermined reference interval following a detection of said transitional pattern;

and means for accumulating the total number of the bit time interval delays during the entry of a predetermined number of bits in said second register means.

6. Data compression apparatus comprising:

a source of data for providing a data word and an accompanying indication of the number of additional data words which are identical within a predefined tolerance with said data word;

encoder means for coding said data word by producing first control pulses at the beginning or middle of selected bit cells corresponding to the bit cells of said data word, said encoder means responding to those uncoded bits of a data word which are of one binary characterization by providing a pulse at the beginning of the corresponding bit cell if the bit cell immediately following said corresponding bit cell contains a bit of said one binary characterization, and at the middle of said corresponding bit cell if the bit cell immediately following said bit of said one binary characterization contains a bit of the other binary characterization, said encoder means producing a pair of said first control pulses in response to three consecutive uncoded bits of said other binary characterization, the first pulse of said pair occurring at the beginning of the bit cell corresponding to the first bit of said three consecutive bits and the second pulse of said pair occurring at the middle of the bit cell corresponding to the second of said three consecutive bits whereby the first pulse of said pair of first control pulses is delayed from a first control pulse by a minimum of 1½ bit cells and a maximum of 2 bit cells;

redundant word character generator means for identifying the number of said additional data words, said generator means responsive to production of at least one of said first control pulses for disabling said encoder means and for generating at least one pair of second control pulses the first of which occurs at the beginning of a bit cell and the second of which occurs at the middle of the succeeding bit cell, the first pulse of said pair of second control pulses being delayed from a first control pulse by at least 2½ bit cells to thereby identify an additional word of data which is identical with said data word, said character generating means enabling said encoder means 1½ bit cells after the second one of said second pair of control pulses.

7. Apparatus for reduced redundancy encoding of binary data comprising:

a source of binary data providing a data word and an associated code word identifying the number of additional data words which are identical with said data word within a predefined tolerance;

first and second logic means responsive to said data word and said code word, respectively, and for providing a bilevel output signal which may be considered as arbitrarily divided into a plurality of bit cells of equal time duration, and which contains transitions between the separately identified levels at the beginning or middle of selected ones of the bit cells for identifying the bits of said data word and said additional data words;

said first logic means including bit comparator means for producing transitions at the beginning or middle of selected ones of said bit cells to identify pairs of bits in adjacent bit cells, said bit comparator means responsive to those uncoded bits of said data word of one binary characterization by providing a transition at the beginning or the middle of each corresponding bit cell containing said bit of said one binary characterization depending upon whether said corresponding bit cell is immediately followed by a bit cell containing a bit of said one binary characterization or the other binary characterization, respectively, to thereby code the two bits in the adjacent bit cells, said bit comparator means responsive to three consecutive uncoded bits of said other binary characterization by providing a transition at the beginning of the bit cell containing the first of said three consecutive bits and a transition at the middle of the bit cell containing the second of said three consecutive bits;

said second logic means responsive to the production of a transition by said first logic means for inhibiting said first logic means at the beginning of the bit cell following the bit cells containing the two bits coded by the transition produced by said first logic means and for thereafter producing a three bit transitional pattern containing a pair of transitions the first of which is produced at the beginning of a bit cell after a delay of 1 bit cell if said number is one or a delay of 2 bit cells if said number is two or more, the second transition of said pair being produced 1½ bit cells after said first transition of said pair;

arithmetic means for reducing said code word by the number of said bit cell delays of the first transition of said transitional pattern;

said second logic means responsive to the number of the reduced code word for producing succeeding transitional patterns which are delayed from the previous transitional pattern by a minimum of 1 bit cell and a maximum of 3 bit cells;

said second logic means responsive to a reduction of the number of said code word to zero for enabling said first logic means whereby transitions in said output signal are separated by a minimum of 1½ bit cells and a maximum of 4½ bit cells and the run length of any particular word is proportional to the total of the delays associated with the first of said pairs of transitions.

* * * * *

UNITED STATES PATENT AND TRADEMARK OFFICE

CERTIFICATE OF CORRECTION

PATENT NO. : 3,873,977

DATED : March 25, 1975

INVENTOR(S) : Duane E. McIntosh

It is certified that error appears in the above-identified patent and that said Letters Patent are hereby corrected as shown below:

Column 6, line 13, "OA CLK" should read -- ØA CLK --.
Column 6, line 14, "OC CLK" should read -- ØC CLK --.
Column 6, line 15, "OAC CLK" should read -- ØAC CLK --.
Column 8, line 47, "OAC CLK" should read -- ØAC CLK --.
Column 8, line 50, "OAC CLK" should read -- ØAC CLK --.
Column 9, line 47, "OA CLK" should read -- ØA CLK --.
Column 10, line 28, "OAC CLK" should read -- ØAC CLK --.
Column 10, line 50, "OAC CLK" should read -- ØAC CLK --.
Column 11, line 49, "OAC CLK" should read -- ØAC CLK --.
Column 15, line 55, "OA CLK" should read -- ØA CLK --.
Column 15, line 66, "OAC CLK" should read -- ØAC CLK --.
Column 16, line 22, "OAC CLK" should read -- ØAC CLK --.
Column 16, line 65, "OAC CLK" should read -- ØAC CLK --.
Column 17, line 50, "OAC CLK" should read -- ØAC CLK --.
Column 17, line 53, "OAC CLK" should read -- ØAC CLK --.
Column 19, line 1, "0's s" should read -- 0's --.
Column 22, line 10, "on" should read -- or --.

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*